United States Patent
Fink

(10) Patent No.: US 10,457,373 B2
(45) Date of Patent: Oct. 29, 2019

(54) AIRCRAFT WITH A FUSELAGE AND A COMPOSITE TAIL BOOM

(71) Applicant: AIRBUS HELICOPTERS DEUTSCHLAND GMBH, Donauworth (DE)

(72) Inventor: Axel Fink, Donauworth (DE)

(73) Assignee: AIRBUS HELICOPTERS DEUTSCHLAND GMBH, Donaworth (DE)

( * ) Notice: Subject to any disclaimer, the term of this patent is extended or adjusted under 35 U.S.C. 154(b) by 327 days.

(21) Appl. No.: 15/654,804

(22) Filed: Jul. 20, 2017

(65) Prior Publication Data

US 2018/0022433 A1    Jan. 25, 2018

(30) Foreign Application Priority Data

Jul. 21, 2016 (EP) ................... 16400029

(51) Int. Cl.
*B64C 1/06* (2006.01)
*B64C 1/12* (2006.01)
(Continued)

(52) U.S. Cl.
CPC .............. *B64C 1/061* (2013.01); *B64C 1/064* (2013.01); *B64C 1/068* (2013.01); *B64C 1/12* (2013.01);
(Continued)

(58) Field of Classification Search
CPC ......... B64C 1/061; B64C 1/068; B64C 1/064; B64C 27/04; B64C 1/12; B64C 2001/0072; B64C 2001/0045
See application file for complete search history.

(56) References Cited

U.S. PATENT DOCUMENTS 2,132,529 A * 10/1938 Firner ..................... B64C 1/061
244/119
4,086,378 A * 4/1978 Kam ....................... B29C 70/22
428/34.5
(Continued)

FOREIGN PATENT DOCUMENTS

| CN | 102114706 | 7/2011 |
| CN | 103341987 | 10/2013 |

(Continued)

OTHER PUBLICATIONS

European Search Report for European Application No. EP 16400029, Completed by the European Patent Office dated Jan. 30, 2017, 5 Pages.

*Primary Examiner* — Assres H Woldemaryam
(74) *Attorney, Agent, or Firm* — Brooks Kushman P.C.

(57) ABSTRACT

An aircraft with a composite tail boom that comprises at least partly a tubular tail boom cone with an outer skin and an inner skin, wherein the inner skin delimits a hollow interior of the composite tail boom, wherein a plurality of rod-shaped stiffening elements and a plurality of ring-shaped stiffening elements are arranged between the outer skin and the inner skin, the plurality of rod-shaped stiffening elements being oriented in longitudinal direction of the composite tail boom and the plurality of ring-shaped stiffening elements being distributed along the longitudinal direction in the tubular tail boom cone.

15 Claims, 4 Drawing Sheets

(51) Int. Cl.
*B64C 27/04* (2006.01)
*B64C 1/00* (2006.01)

(52) U.S. Cl.
CPC ...... *B64C 27/04* (2013.01); *B64C 2001/0045* (2013.01); *B64C 2001/0072* (2013.01)

(56) References Cited

U.S. PATENT DOCUMENTS

| | | | | |
|---|---|---|---|---|
| 4,200,252 A | * | 4/1980 | Logan | B64C 27/82 244/130 |
| 5,377,934 A | * | 1/1995 | Hill | B64C 27/04 244/117 R |
| 5,676,335 A | * | 10/1997 | Murgia, Jr. | B64C 27/82 244/17.19 |
| 6,729,576 B2 | * | 5/2004 | Kay | B64C 1/06 244/17.11 |
| 6,755,374 B1 | * | 6/2004 | Carson | B64C 27/82 244/17.11 |
| 8,561,938 B2 | * | 10/2013 | Dickman | B64C 27/82 244/17.13 |
| 2007/0011970 A1 | * | 1/2007 | Hethcock | B64C 1/068 52/481.1 |
| 2008/0111024 A1 | | 5/2008 | Lee et al. | |
| 2009/0217529 A1 | | 9/2009 | Cerezo et al. | |
| 2013/0092792 A1 | * | 4/2013 | Oldroyd | B29C 66/5221 244/119 |
| 2014/0331473 A1 | * | 11/2014 | Smith | B64F 5/50 29/429 |
| 2016/0001869 A1 | | 1/2016 | Jorn et al. | |
| 2016/0185437 A1 | | 6/2016 | Arevalo Rodriguez | |
| 2018/0043982 A1 | * | 2/2018 | Fink | B64C 1/061 |

FOREIGN PATENT DOCUMENTS

| | | |
|---|---|---|
| DE | 102014109362 | 1/2016 |
| EP | 1145828 | 10/2001 |
| EP | 2062814 | 5/2009 |
| EP | 3040263 | 7/2016 |
| WO | 2004076769 | 9/2004 |

\* cited by examiner

AIRCRAFT WITH A FUSELAGE AND A COMPOSITE TAIL BOOM

CROSS-REFERENCE TO RELATED APPLICATIONS

This application claims priority to European patent application No. EP 16400029.1 filed on Jul. 21, 2016, the disclosure of which is incorporated in its entirety by reference herein.

BACKGROUND OF THE INVENTION

(1) Field of the Invention

The invention is related to an aircraft with a composite tail boom that comprises at least partly a tubular tail boom cone with an outer skin and an inner skin, wherein the inner skin delimits a hollow interior of the composite tail boom.

(2) Description of Related Art

Tail boom structures are present in different types of aircrafts, such as rotary wing aircrafts and fixed wing aircrafts, wherein respective tail booms represent a cantilevered longitudinal beam hat extends essentially rearwards from an aft portion of a given aircraft and that provides mounting points for tail surfaces and, in case of rotary wing aircrafts such as helicopters, e. g. for tail rotors.

For fixed wing aircrafts, usually two tail booms are used, each tail boom being attached to a wing that is arranged at an associated side of a respective fuselage. In this configuration, usually horizontal and vertical stabilizers are attached at rearmost ends of the tail booms, wherein the horizontal stabilizer typically spans a predetermined distance between both tail booms.

Usually, a tail boom exhibits a pronounced slenderness ratio with a small cross section with respect to an underlying length of the tail boom. Its cross section is typically curved, oval or circular, hence exploiting structural advantages in terms of stability, as well as aerodynamic advantages in terms of download, which occurs in rotary wing aircrafts such as helicopters due to main rotor downwash.

More specifically, a tail boom for rotary wing aircrafts and fixed wing aircrafts usually comprises a bending beam supporting bending, torsional and shear loads, mainly excited at its tail surfaces and, in case of rotary wing aircrafts such as helicopters, at their tail rotors. However, due to the pronounced slenderness ratio, bending loads that are occurring in operation become predominant and, hence, dimensioning at a respective root interconnection of a given tail boom to an associated fuselage or wing.

In rotary wing aircrafts such as helicopters, the tail boom usually comprises a load carrying tail boom structure that accommodates driving controls associated with the tail rotor, antennae and/or other systems. Corresponding driving shafts for driving the tail rotor are typically arranged outside and on top of this load carrying tail boom structure to allow for easy inspection and maintenance. The load carrying tail boom structure must generally be designed according to static, dynamic and fatigue requirements, wherein especially the fatigue requirements are comparatively demanding requirements. In particular, the load carrying tail boom structure must be provided with a suitable bending and torsional stiffness, a suitable strength and an appropriate mass. In addition, operational requirements, such as corrosion resistance, ability for dismounting, ability for replacement and even interchangeability must be considered for a suitable service operation. The term "ability for replacement" generally refers to exchanging a tail boom with another one, while the term "interchangeability" generally refers to using the tail boom of one helicopter for another one.

On the basis of these design and operational requirements, two types of load carrying tail boom structures are mainly implemented, which differ from each other with respect to their structural integration within the main fuselage body. More specifically, a first type of tail boom is defined as a slim beam element that is attached on its front end to an aft and top region of the main fuselage body. This arrangement, however, leads to a reduction of a respective cabin height in the aft region of the main fuselage body and, in the case of rear loading helicopter configurations, to a reduction of a corresponding loading clearance. Such tail booms according to the first type usually comprise an essentially cylindrical cross section with a flat top or bottom base. A second type of tail boom is defined as one single boom that is attached to the main fuselage body by means of a smoothly tapered transition from the main fuselage body to the tail (so-called "fish tails"). Its cross section is, however, larger than that of the tail boom according to the first type, thus, leading to larger downloads generated by downwash of the main rotor in operation.

Usually, both types of tail booms are embodied as composite tail booms and provided with a connection interface at their transitions to the main fuselage body. Typically, there is a structural kink in the loft of the main fuselage body, which corresponds to the connection interface of the tail boom that is mounted to a corresponding connecting section of the main fuselage body. In other words, a physical separation between the main fuselage body and the tail boom is typically implemented, which allows for a separate manufacturing of the tail boom structure with respect to the main fuselage body. Such a separate manufacturing and the connection interface are advantageous in that they allow for a replacement of the tail boom, if required, and in that a suitable transportability can be guaranteed, in particular for larger sizes of helicopters.

More generally, such composite tail booms of rotary wing aircrafts and fixed wing aircrafts are of stressed skin type, either with monocoque or semi-monocoque design. The monocoque design is characterized by a skin that supports all loads without additional discrete structural elements, such as longitudinal stiffeners—typically called stringers—or transverse intermediate stiffeners—typically defined by frames—attached to the skin. The semi-monocoque design—or so-called skin-stiffened design—is characterized by a thin skin which is supported by a discrete back structure composed of stringers and frames, the stringers taking a considerable portion of longitudinal loads that are occurring in operation.

Usually, respective stringers are either co-cured, i.e. simultaneously cured, with the skin, bonded or riveted to the skin. Respective hoop stiffeners, i.e. frames, are usually riveted to the skin, onto the stringers, or both, and show a height which is greater than a respective height of the stringers. Accordingly, the stringers are continuous and pass through the hoop stiffeners, i.e. the frames. The latter show local cut-outs in order to allow the stringers to pass therethrough. However, differential hoop stiffeners, i.e. frames, require additional riveting, thus, leading to increased assembly time and cost.

In general, skin stiffened designs are widely used in composite design, based on their origin in metallic constructions. Exemplary skin stiffened designs are described in the documents CN103341987, CN102114706, EP1145828, US2008111024 and WO2004076769. Other aircraft structures as per documents EP3040263 or US2016185437, US2016001869 or DE102014109362, EP2062814 or US2009217529 and US2008111024 were also considered.

However, use of a monocoque tail boom cone with a monolithic skin is not weight efficient, since stability performance requires large skin thicknesses, which are actually not necessary in terms of strength. Hence, this design has not been used, despite its evident cost advantages. In contrast thereto, monocoque tail boom cone design based on a sandwich type shell construction has found a wide application, also for metallic tail boom designs. In this case, the skin thickness can be adapted to underlying strength and handling requirements, whereas applicable stability requirements can be adjusted by means of a definite core thickness.

More specifically, the core is typically of honeycomb type, which is bonded to respective inner and outer skins by means of an adhesive layer. The inner skin typically represents a stabilizing skin with minimum handling thickness, whereas the outer skin is the main load bearing skin with enough thickness to cope with impact threats and allowing repairing. Additional outer impermeable layers can be implemented to cope with moisture absorption.

Advantageously, sandwich structures as such are characterized by a simple and straightforward design and sizing and offer weight efficiency advantages over conventional semi-monocoque designs within specific load level ranges. However, sandwich designs must use a film adhesive which excites some weight, operational and cost penalties. Furthermore, an acceptable operational temperature of the structure in operation is limited by an allowable service temperature of the adhesive, which leads in particular with respect to rotary wing aircrafts, such as helicopters, to some concerns for tail boom applications facing hot exhaust gases hitting a top and side shell of a front and middle portion of a respective tail boom. Moreover, sandwich structures require a careful production, especially when dealing with structural repairs. In addition, sandwich panels used in sandwich structures are inherently stiff in bending all over their extension, which leads to a more sensitive behavior that is less damage resistant with respect to impact in comparison to skin-stiffened panels. Furthermore, a driving parameter facing panel stability is a respectively underlying core height. The core height and an applicable skin thickness, without considering some effects of skin orthotropic lay-ups, are typically continuous and constant all over a sandwiched field of a given tail boom cone. As a result, a shell bending stiffness of tail boom structures with sandwich type design is essentially the same in hoop and longitudinal direction for rotary wing aircrafts and fixed wing aircrafts.

BRIEF SUMMARY OF THE INVENTION

It is, therefore, an object of the present invention to provide an aircraft with a highly efficient structural design of a composite tail boom that is based on a semi-monocoque design with a stressed skin and a stiffening framework, the highly efficient structural design being particularly applicable for tail boom structures of rotary wing aircrafts, but being as well useable for general aircraft applications, such as e. g. for fixed wing aircrafts. More specifically, it is an object of the present invention to provide a highly efficient structural design of a composite tail boom that is based on a semi-monocoque design with a stressed skin and a stiffening framework.

This object is solved by a composite tail boom for an aircraft, the composite tail boom comprising at least partly a tubular tail boom cone with an outer skin and an inner skin, wherein the inner skin delimits a hollow interior of the composite tail boom, the composite tail boom comprising the features of claim 1.

More specifically, according to the present invention the composite tail boom for an aircraft comprises at least partly a tubular tail boom cone with an outer skin and an inner skin, wherein the inner skin delimits a hollow interior of the composite tail boom, and wherein a plurality of rod-shaped stiffening elements and a plurality of ring-shaped stiffening elements are arranged between the outer skin and the inner skin. The plurality of rod-shaped stiffening elements is oriented in longitudinal direction of the composite tail boom and the plurality of ring-shaped stiffening elements is distributed along the longitudinal direction in the tubular tail boom cone. At least one of the plurality of ring-shaped stiffening elements comprises an associated thickness in radial direction of the tubular tail boom cone that is smaller than an associated thickness of at least one of the plurality of rod-shaped stiffening elements in radial direction of the tubular tail boom cone.

According to one aspect, the inventive composite tail boom is based on a considerably simplified integral skin-stiffened composite design in semi-monocoque structure, which is implemented without use of adhesive material, so that undesired temperature service limitations can advantageously be avoided. This integral skin-stiffened composite design in semi-monocoque structure is preferably realized at least by means of an outer and an inner skin, longitudinal stiffening elements and hoop stiffening elements, with reduced design and manufacturing complexity of nodal points, i. e. intersections of longitudinal and hoop stiffening elements, which may be implemented as continuous elements. The integral skin-stiffened composite design in semi-monocoque structure may further comprise core elements, as well as longitudinal inner and outer cap plies, which are advantageously implemented as continuous elements.

The outer skin is preferably made of continuous plies and represents an external skin of the inventive composite tail boom, i. e. its tubular tail boom cone. The inner skin is preferably draped within the inventive composite tail boom, i. e. its tubular tail boom cone, and covers a provided arrangement of outer skin, longitudinal inner and outer cap plies, core elements and hoop stiffening elements entirely. Preferably, the inner skin exhibits a thickness that is equal or less than a respective outer skin thickness, preferentially thinner.

A respective skin portion delimited by the longitudinal stiffening elements and the hoop stiffening elements is hereinafter denoted as bay, said bay comprising a total thickness that is defined by the inner and outer skin. The bay width is preferentially at least two times larger than a basis width of each longitudinal stiffening element.

The longitudinal stiffening elements are preferably implemented as rod-shaped stiffening elements and, for clarity, also referred to as such hereinafter. They are preferentially arranged at least essentially in longitudinal direction along a respective tail boom axis and they are provided for longitudinal bending stiffness and, hence, shell stability. Their cross section is closed, hence, providing for shell torsional stiffness. An exterior skin of each longitudinal stiffening element preferentially comprises an inner portion, an outer portion and two side portions. The side portions are built out of the inner skin of the inventive composite tail boom. The inner portion is built from this inner skin and the longitudinal inner cap plies. The outer portion is part of a respective external hull of the inventive composite tail boom and is built from its outer skin and the longitudinal outer cap plies. The longitudinal stiffening elements are preferably separated from each other by a pitch distance that is at least three times larger than a basis width of each longitudinal stiffening element.

Preferably, each longitudinal stiffening element has a shape that is defined by an associated core element. More specifically, the core elements preferentially define the shape of the longitudinal stiffening elements during curing and remain in place after curing. They are, however, only means for manufacturing and are, preferably, not required as supporting elements for the inner and outer skin of the inventive composite tail boom, which encompass each core element and, thereby, define the longitudinal stiffening elements. Hence, no adhesion film is present between the core elements and the outer and inner skin contacting the core elements. Preferably, the core elements are made of foam. Preferentially, the core elements comprise local recesses in order to allow the hoop stiffening elements to pass therethrough. An underlying recess geometry is adapted in accordance to a respective hoop stiffening element cross section.

The longitudinal inner cap plies are preferably optional and provide for shell longitudinal stiffness and, hence, overall bending stiffness of the inventive composite tail boom. In addition, they provide for larger longitudinal bending stiffness of the longitudinal stiffening elements and, hence, more panel stability. Preferably, the longitudinal inner cap plies are at least essentially straight and uninterrupted. As the longitudinal inner cap plies are preferably optional, in one implementation no longitudinal inner cap plies are used so that the inner portion of the longitudinal stiffening element is only built by the inner skin of the inventive composite tail boom.

The longitudinal outer cap plies are preferably also optional and provide for shell longitudinal stiffness and, hence, overall bending stiffness of the inventive composite tail boom, if being unidirectional and oriented in axial, i. e. longitudinal direction of the inventive composite tail boom. In that case, they additionally provide for lager longitudinal bending stiffness of the longitudinal stiffening elements. The longitudinal outer cap plies can further be used to improve local stability of the outer skin of the inventive composite tail boom at each basis of each longitudinal stiffening element. For that purpose, an underlying orientation of the longitudinal outer cap plies should preferably not be oriented longitudinally. According to one aspect, they are smeared all around a respective perimeter of the inventive composite tail boom's cross section so as to build an additional ply, hence, simplifying manufacturing.

The hoop stiffening elements are preferably implemented as ring-shaped stiffening elements and, for clarity, also referred to as such hereinafter. They are preferentially provided for support of the longitudinal stiffening elements. Preferably, the hoop stiffening elements are monolithic and exhibit a thickness that is at least three times smaller than a respective height of the longitudinal stiffening elements. A preferred laminate configuration of the hoop stiffening elements comprises preferably a comparatively high amount of 90° plies, oriented in hoop direction in order to provide for large flexural modulus of the hoop stiffening elements.

It should be noted that a shell bending stiffness of tail boom structures with sandwich type design is conventionally essentially the same in hoop and longitudinal direction. Facing a tail boom structure with a pronounced slenderness ratio and large curvatures, as it is e. g. the case for conventional cantilevered tail booms for small-to-medium helicopters, such a sandwich design with identical longitudinal and hoop shell bending stiffness would be oversized, since the required longitudinal and hoop shell bending stiffness must not necessarily be identical. This fact can be used for optimizations based on tailoring of the required bending stiffness in longitudinal and hoop direction.

More specifically, considering stability requirements of monolithic, orthotropic, compressive-loaded cylinders, a respective longitudinal shell stability—together with an associated shell torsional stability—is a driving parameter regarding panel stability, the hoop bending stiffness being, hence, of secondary relevance. This leads to the possibility of introducing a design featuring a pronounced longitudinal bending stiffness, acceptable torsional stiffness and a lower hoop stiffness. A comparatively high longitudinal stiffness is advantageously provided by the longitudinal stiffening elements with adequate height and spacing, i. e. pitch distance. A respective cross section of these longitudinal stiffening elements is closed, hence, providing for adequate panel torsional rigidity. Hoop stiffness is provided by a comparatively large spacing between adjacent hoop stiffening elements.

However, in order to avoid panel instability providing for efficient support of the longitudinal stiffening elements, the hoop stiffening elements must feature an adequate predetermined hoop bending stiffness. The larger the longitudinal stiffness is, the lesser the predetermined hoop bending stiffness of the hoop stiffening elements and the larger the interspacing, i. e. the pitch distance of the hoop stiffening elements can be selected. The bending stiffness of the longitudinal and hoop stiffening elements is mainly driven by their heights, i. e. extensions in radial direction of the inventive composite tail boom.

It should be noted that respective intersection points, respectively intersections, of mutually orthogonally oriented stiffening elements, i. e. the longitudinal and hoop stiffening elements, are the most critical locations of integral skin-stiffened designs, requiring usually interruptions of these elements as well as time and cost consuming manufacturing steps with intensive cutting and drape work and lower quality. These drawbacks are even more pronounced when having hoop stiffening elements with small pitch distances and with same or larger height than associated longitudinal stiffening elements. As result thereof, the longitudinal stiffening elements of the inventive composite tail boom preferably exhibit a height that is at least two and preferably three times larger than a respective height of the hoop stiffening elements, which is something different in comparison to conventional semi-monocoque designs.

Advantageously, the comparatively larger height of the longitudinal stiffening elements in comparison to the hoop stiffening element height allows provision of continuous longitudinal inner and outer cap plies that are implemented joggle-free along the longitudinal extension of the inventive composite tail boom. This leads to an undisturbed main longitudinal load path and large global stiffness of the inventive composite tail boom. Only the thin inner skin of the inventive composite tail boom that covers the entire arrangement may exhibit minor longitudinal joggles at each location of a hoop stiffening element.

The hoop stiffening elements are preferably monolithic rings of adequate thickness and adequate laminate configuration. Their bending stiffness is a result of their width, their height and a laminate with a large 90°-ply content, i. e. unidirectional plies that are oriented circumferentially with respect to the hoop stiffening elements. The fact of keeping the height of the hoop stiffening elements to a minimum leads to a simple design of the intersections of the hoop and longitudinal stiffening elements, thus, simplifying manufacturing and improving quality. Advantageously, a hoop stiffening element thickness of about 3 mm is sufficient to provide for stability of the inventive composite tail boom, if the latter is provided with low ratios of bending moment vs. cross section curvature. The monolithic design of the hoop stiffening elements can result in a slight increase in structural weight, which has to be evaluated against cost and assembly saving when comparing to differentially installed frames.

According to one aspect, the design of the inventive composite tail boom's shell is subcritical, i. e. there is no stability loss until design ultimate load. This is considered advantageous since an occurring post-buckling regime can lead to negative effects of defects and excessive strains. However, avoidance of bay skin buckling allows the entire inner and outer skin of the inventive composite tail boom to be effective as bending member until collapse. An unavoidable weight penalty is, for these applications, considered as being negligible. Nevertheless, the discrete design still allows for load redistributions in case of evident damage, which represents an important advantage over monocoque designs.

According to a preferred embodiment, the associated thickness of the at least one of the plurality of ring-shaped stiffening elements is at least three times smaller than the associated thickness of the at least one of the plurality of rod-shaped stiffening elements.

According to a further preferred embodiment, each two rod-shaped stiffening elements of the plurality of rod-shaped stiffening elements are spaced apart from each other in hoop direction of the tubular tail boom cone by a first predetermined distance and each two ring-shaped stiffening elements of the plurality of ring-shaped stiffening elements are spaced apart from each other in longitudinal direction of the tubular tail boom cone by a second predetermined distance, wherein the first predetermined distance is smaller than the second predetermined distance.

According to a further preferred embodiment, the first predetermined distance is at least five times smaller than the second predetermined distance.

According to a further preferred embodiment, each two rod-shaped stiffening elements of the plurality of rod-shaped stiffening elements are spaced apart from each other in hoop direction of the tubular tail boom cone by a predetermined distance that is at least two times larger than a predetermined basis width of each one of the plurality of rod-shaped stiffening elements.

According to a further preferred embodiment, the plurality of ring-shaped stiffening elements is mounted to the outer skin.

According to a further preferred embodiment, the plurality of rod-shaped stiffening elements is mounted to the plurality of ring-shaped stiffening elements and the outer skin.

According to a further preferred embodiment, the plurality of rod-shaped stiffening elements comprises accommodation grooves for accommodating the plurality of ring-shaped stiffening elements.

According to a further preferred embodiment, each one of the plurality of rod-shaped stiffening elements is provided with an associated inner cap ply that is arranged between the rod-shaped stiffening element and the inner skin.

According to a further preferred embodiment, each one of the plurality of rod-shaped stiffening elements is provided with an associated outer cap ply that is arranged between the rod-shaped stiffening element and the outer skin.

According to a further preferred embodiment, the associated outer cap ply is at least partly arranged between each one of the plurality of ring-shaped stiffening elements and the outer skin.

According to a further preferred embodiment, an associated basis width of each one of the plurality of rod-shaped stiffening elements equals at least approximately an associated width of each one of the plurality of ring-shaped stiffening elements.

According to a further preferred embodiment, at least one of the plurality of rod-shaped stiffening elements comprises a trapezoidal cross section.

According to a further preferred embodiment, the outer skin is thicker than the inner skin.

The present invention further provides an aircraft with a composite tail boom that comprises at least partly a tubular tail boom cone with an outer skin and an inner skin, wherein the inner skin delimits a hollow interior of the composite tail boom. A plurality of rod-shaped stiffening elements and a plurality of ring-shaped stiffening elements are arranged between the outer skin and the inner skin. The plurality of rod-shaped stiffening elements is oriented in longitudinal direction of the composite tail boom and the plurality of ring-shaped stiffening elements is distributed along the longitudinal direction in the tubular tail boom cone. At least one of the plurality of ring-shaped stiffening elements comprises an associated thickness in radial direction of the tubular tail boom cone that is smaller than an associated thickness of at least one of the plurality of rod-shaped stiffening elements in radial direction of the tubular tail boom cone.

BRIEF DESCRIPTION OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
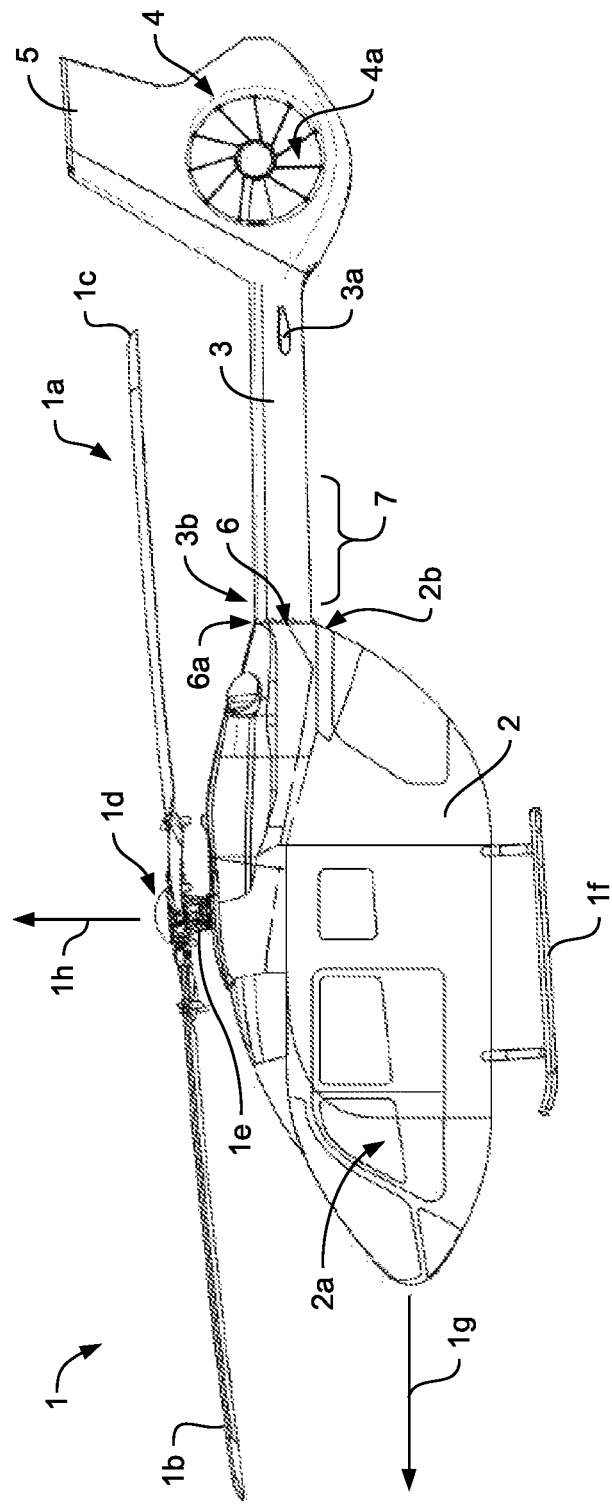
FIG. 1 shows a lateral view of a helicopter with a composite tail boom according to the invention.

FIG. 1 shows an aircraft 1 that is exemplarily illustrated as a rotary wing aircraft and, more particularly, as a helicopter. Thus, for purposes of simplicity and clarity, the aircraft 1 is hereinafter referred to as the "helicopter" 1.

Illustratively, the helicopter 1 comprises a fuselage 2 that is connected to a landing gear 1f and defines a cabin 2a and a rear fuselage 2b. The rear fuselage 2b is connected to a tail boom 3 having a longitudinal extension direction 1g, which corresponds to the helicopter's roll axis that is inherent to the helicopter 1 and which is hereinafter referred to as the "roll axis 1g" for simplicity and clarity. The helicopter 1 is further shown having a height direction 1h, which corresponds to the helicopter's yaw axis and which is hereinafter referred to as the "yaw axis 1h" for simplicity and clarity. Preferably, but not necessarily, the helicopter 1 is symmetrical about the yaw axis 1h and the roll axis 1g.

The helicopter 1 further comprises at least one multi-blade main rotor 1a for providing lift and forward or backward thrust during operation. The at least one multi-blade main rotor 1a comprises a plurality of rotor blades 1b, 1c that are mounted at an associated rotor head 1d to a rotor shaft 1e, which rotates in operation of the helicopter 1 around an associated rotor axis.

By way of example, the helicopter 1 further comprises at least one preferentially shrouded counter-torque device 4 configured to provide counter-torque during operation, i. e. to counter the torque created by rotation of the at least one multi-blade main rotor 1a for purposes of balancing the helicopter 1 in terms of yaw. The at least one counter-torque device 4 is illustratively provided at an aft section of the tail boom 3 and preferably comprises a tail rotor 4a. The aft section of the tail boom 3 preferably further comprises a fin 5. Illustratively, the tail boom 3 is also provided with a suitable horizontal stabilizer 3a.

According to one aspect, the tail boom 3 is a composite tail boom, i. e. a tail boom that comprises composite material and that is preferably at least essentially manufactured from composite material. Illustratively, the composite tail boom 3 is preferably implemented as a slim beam element that is preferentially oriented at least essentially in parallel to the roll axis 1g of the helicopter 1, and comprises at least partly a tail boom cone 3b, which is preferably tubular. In other words, the composite tail boom 3 is preferentially a closed structure with a nearly circular cross section.

The composite tail boom 3 is preferably connected to the fuselage 2 and, more specifically, the rear fuselage 2b, at an interface plane 6a by means of an associated connection interface 6 that is provided at the composite tail boom 3. The interface plane 6a is preferably defined by the rear fuselage 2b. However, it should be noted that a suitable implementation of the associated interface plane 6a is well-known to the person skilled in the art and, therefore, not described in further detail for brevity and conciseness. Furthermore, a suitable connection interface implementing the associated connection interface 6 is likewise well-known to the person skilled in the art and, therefore, also not described in further detail for brevity and conciseness.

According to one aspect, the composite tail boom 3 is implemented as an integral skin-stiffened composite tail boom in semi-monocoque structure. A section 7 of this integral skin-stiffened composite tail boom in semi-monocoque structure 3 is exemplarily and representatively described in detail below.

Figure 2:
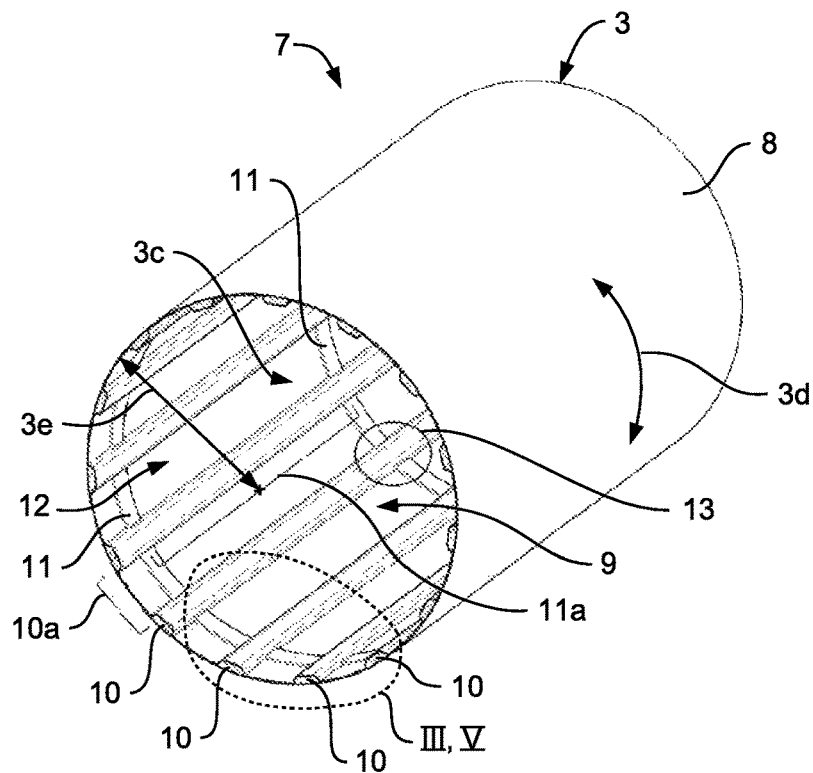
FIG. 2 shows a perspective view of a section of the composite tail boom of FIG. 1.

FIG. 2 shows the section 7 of the composite tail boom 3 of FIG. 1 that comprises at least partly the tubular tail boom cone 3b. According to one aspect, the tubular tail boom cone 3b and, more generally, the composite tail boom 3 as such comprises an outer skin 8 and an inner skin 9. The inner skin 9 preferably delimits a hollow interior 3c of the tubular tail boom cone 3b, i. e. the composite tail boom 3, which is illustratively shown with a hoop direction 3d and a radial direction 3e. The outer skin 8 is preferably thicker than the inner skin 9.

According to one aspect, a plurality of rod-shaped stiffening elements 10 and a plurality of ring-shaped stiffening elements 11 are arranged between the outer skin 8 and the inner skin 9. Each one of the plurality of rod-shaped stiffening elements 10 and each one of the plurality of ring-shaped stiffening elements 11 preferably intersect each other at associated stiffening element intersections. It should, however, be noted that for simplicity and clarity of the drawings only a single stiffening element intersection is labelled with the reference sign "13". It should further be noted that only four rod-shaped stiffening elements of the plurality of rod-shaped stiffening elements 10 are individually labelled with the reference sign "10", and that only two ring-shaped stiffening elements of the plurality of ring-shaped stiffening elements 11 are individually labelled with the reference sign "11", for simplicity and clarity of the drawings.

The plurality of rod-shaped stiffening elements 10 is preferably oriented in the longitudinal direction 1g of FIG. 1 of the composite tail boom 3, i. e. preferentially at least essentially in parallel to the roll axis 1g of FIG. 1, and therefore also referred to in the present application as the plurality of "longitudinal stiffening elements". The plurality of ring-shaped stiffening elements 11 is preferably distributed in the tubular tail boom cone 3b along the longitudinal direction 1g of FIG. 1 of the composite tail boom 3, i. e. along the roll axis 1g of FIG. 1, and due to their ring shape also referred to in the present application as the plurality of "hoop stiffening elements".

Preferably, each two rod-shaped stiffening elements 10 of the plurality of rod-shaped stiffening elements 10 are spaced apart from each other in the hoop direction 3d by a predetermined rod-shaped stiffening element distance 10a. Furthermore, each two ring-shaped stiffening elements 11 of the plurality of ring-shaped stiffening elements 11 are preferably spaced apart from each other in the longitudinal direction 1g of FIG. 1 of the composite tail boom 3, i. e. the tubular tail boom cone 3b, by a predetermined ring-shaped stiffening element distance 11a.

According to one aspect, the predetermined rod-shaped stiffening element distance 10a is smaller than the predetermined ring-shaped stiffening element distance 11a. Preferably, the rod-shaped stiffening element distance 10a is at least five times smaller than the predetermined ring-shaped stiffening element distance 11a.

Illustratively, the rod-shaped stiffening elements 10 and the ring-shaped stiffening elements 11 delimit respective skin portions 12, which are referred to hereinafter as the "bays 12". Each such bay 12 preferably comprises a total thickness in the radial direction 3e that is defined by respective thicknesses of the outer and inner skins 8, 9.

Figure 3:
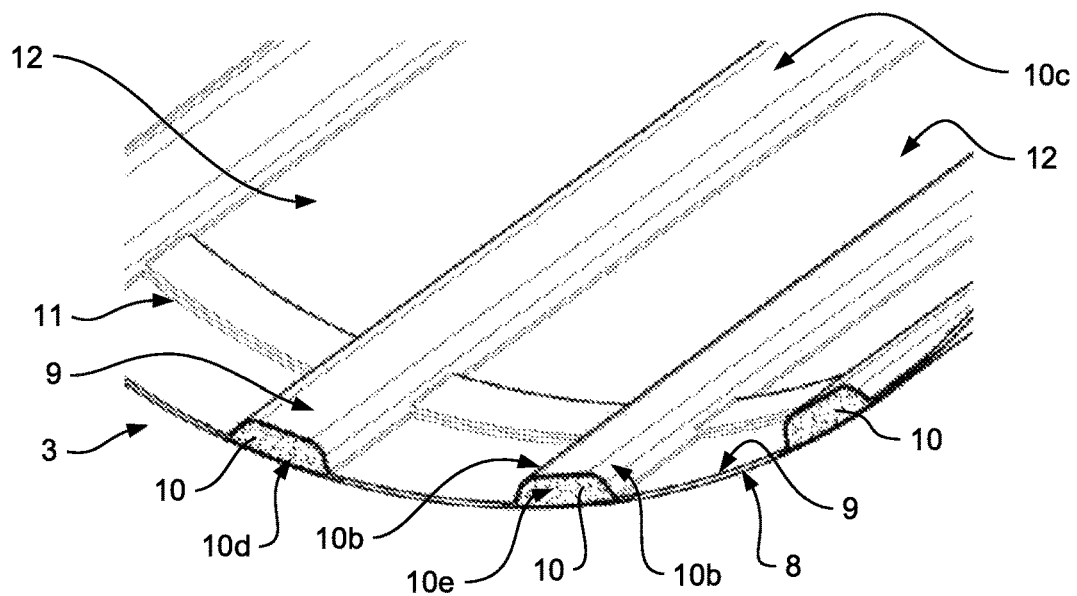
FIG. 3 shows an enlarged detail of the composite tail boom of FIG. 2.

FIG. 3 shows an enlarged detail of the composite tail boom 3 of FIG. 1 and FIG. 2 for further illustrating the arrangement of the rod-shaped stiffening elements 10 and the ring-shaped stiffening elements 11 between the outer skin 8 and the inner skin 9 of FIG. 2. FIG. 3 also further illustrates the bays 12 of FIG. 2 that are delimited by the rod-shaped stiffening elements 10 and the ring-shaped stiffening elements 11.

According to one aspect, at least one and, preferably, each one of the plurality of rod-shaped stiffening elements 10 comprises a trapezoidal cross section. Illustratively, each rod-shaped stiffening element 10 is defined by lateral walls 10b, an inner wall 10c and an outer wall 10d, which define the trapezoidal cross section. Preferably, an associated core element 10e is arranged between the lateral walls 10b, the inner wall 10c and the outer wall 10d. The associated core element 10e is preferentially made of foam.

Figure 4:
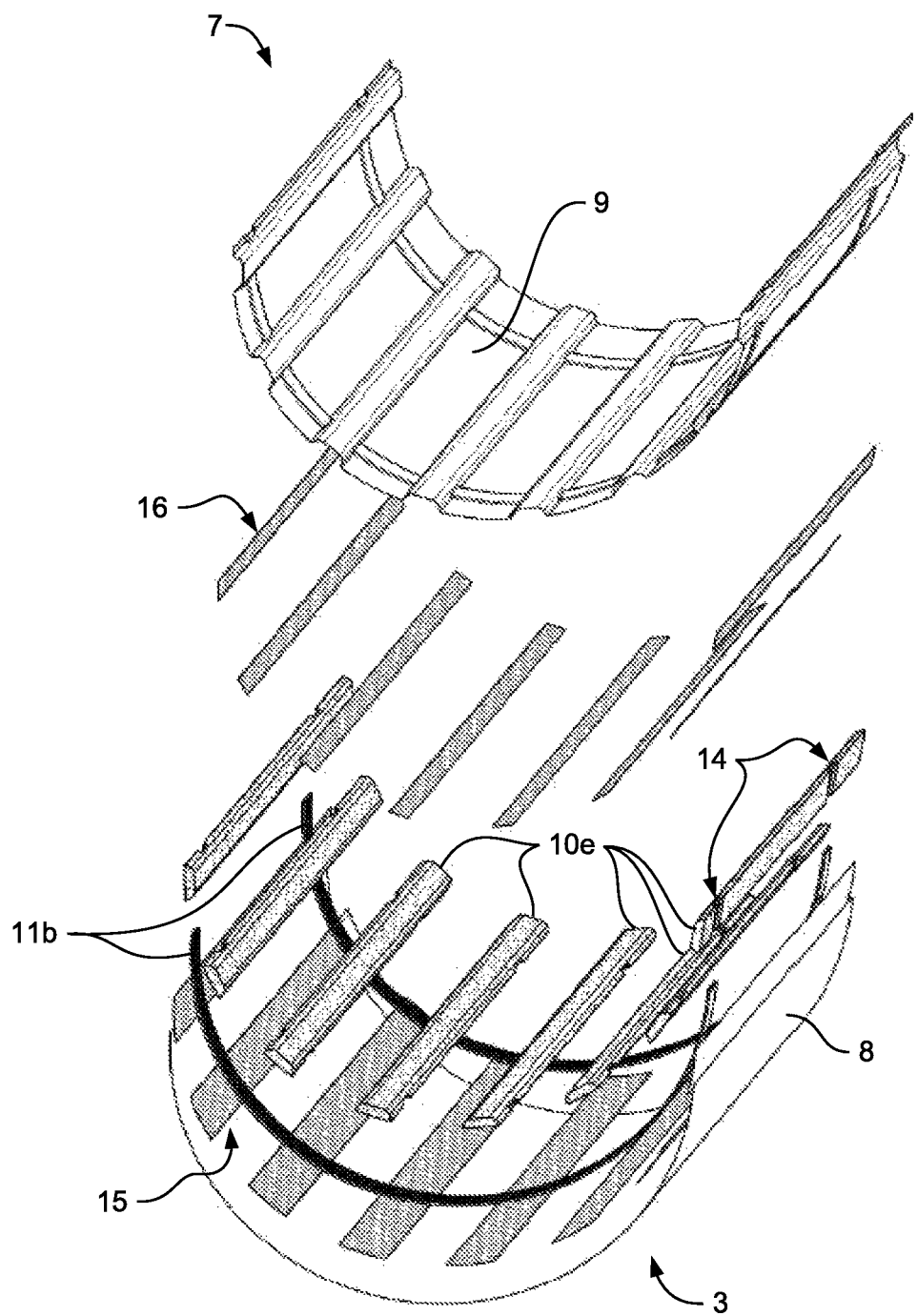
FIG. 4 shows an exploded view of a lower shell of the section of the composite tail boom of FIG. 2.

FIG. 4 shows a lower semi shell of the composite tail boom 3 of FIG. 1 and FIG. 2 for illustrating an exemplary semi-monocoque realization of the composite tail boom 3. More specifically, as described above the composite tail boom 3 is preferably implemented as an integral skin-stiffened composite tail boom in semi-monocoque structure. This semi-monocoque structure can e. g. be implemented by means of lower and upper semi shells that are attached to each other for constructing the composite tail boom 3. In other words, an upper semi shell can be constructed similar to the lower semi shell illustrated in FIG. 4 and then be attached to the lower semi shell such that both together define the tubular tail boom cone 3b of FIG. 1.

As described above, the rod-shaped stiffening elements 10 of FIG. 2 and the ring-shaped stiffening elements 11 of FIG. 2 are arranged between the outer skin 8 and the inner skin 9 of FIG. 2. According to one aspect, initially the plurality of ring-shaped stiffening elements 11, i. e. respective ring-shaped stiffener cores 11b and, more specifically, semi ring-shaped stiffener cores 11b, is/are mounted to the outer skin 8. Furthermore, the plurality of rod-shaped stiffening elements 10 of FIG. 2, i. e. the associated core elements 10e of FIG. 3, is/are preferably mounted to the plurality of ring-shaped stiffening elements 11, i. e. the respective ring-shaped stiffener cores 11b and, more specifically, the semi ring-shaped stiffener cores 11b, and to the outer skin 8. For enabling such an arrangement, the plurality of rod-shaped stiffening elements 10, i. e. the associated core elements 10e, preferably comprises accommodation grooves 14 for accommodating the plurality of ring-shaped stiffening elements 11, i. e. respective ring-shaped stiffener cores 11b and, more specifically, semi ring-shaped stiffener cores 11b. Subsequently, the inner skin 9 is mounted onto the plurality of rod-shaped stiffening elements 10, i. e. the associated core elements 10e, the plurality of ring-shaped stiffening elements 11, i. e. the respective ring-shaped stiffener cores 11b and, more specifically, the semi ring-shaped stiffener cores 11b, and the outer skin 8.

According to one aspect, each one of the plurality of rod-shaped stiffening elements 10 of FIG. 2, i. e. each one of the associated core elements 10e of FIG. 3, is provided with an associated outer cap ply 15 that is arranged between the rod-shaped stiffening element 10, i. e. the associated core element 10e, and the outer skin 8. Preferably, the associated outer cap ply 15 is at least partly arranged between each one of the plurality of ring-shaped stiffening elements 11, i. e. each one of the respective ring-shaped stiffener cores 11b and, more specifically, each one of the semi ring-shaped stiffener cores 11b, and the outer skin 8. However, it should be noted that the associated outer cap plies 15 are merely optional and use thereof can likewise be omitted.

According to another aspect, each one of the plurality of rod-shaped stiffening elements 10 of FIG. 2, i. e. each one of the associated core elements 10e of FIG. 3, is provided with an associated inner cap ply 16 that is arranged between the rod-shaped stiffening element 10, i. e. the associated core element 10e, and the inner skin 9. However, it should be noted that the associated inner cap plies 16 are merely optional and use thereof can likewise be omitted.

Figure 5:
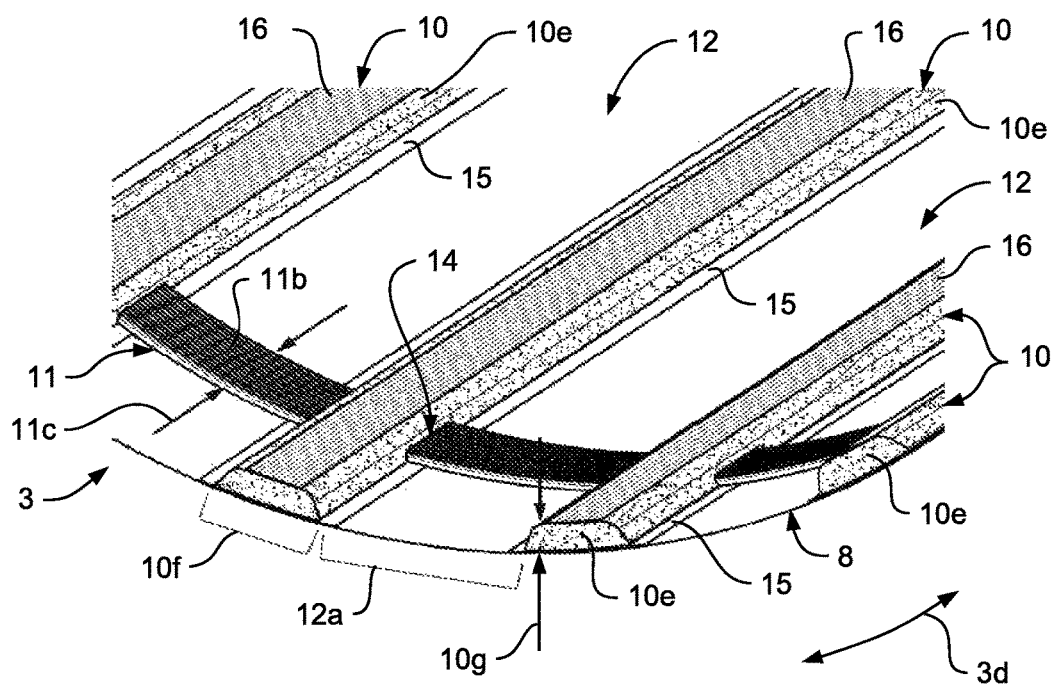
FIG. 5 shows the enlarged detail of the composite tail boom of FIG. 3 without inner skin.

FIG. 5 shows the composite tail boom 3 of FIG. 3 without the inner skin 9, for further illustrating the accommodation grooves 14 of FIG. 4, which are provided in the plurality of rod-shaped stiffening elements 10 of FIG. 3, i. e. the associated core elements 10e of FIG. 4. Furthermore, FIG. 5 illustrates the arrangement of the ring-shaped stiffening elements 11 of FIG. 3, i. e. each one of the respective ring-shaped stiffener cores 11b of FIG. 4 and, more specifically, each one of the semi ring-shaped stiffener cores 11b of FIG. 4, on the outer skin 8 of FIG. 3 and in the accommodation grooves 14 of the rod-shaped stiffening elements 10, i. e. the associated core elements 10e. Moreover, FIG. 5 illustrates the bays 12 of FIG. 3 that are delimited by the rod-shaped stiffening elements 10 and the ring-shaped stiffening elements 11. Finally, FIG. 5 also illustrates the optional arrangement of the associated outer and inner cap plies 15, 16 on the associated core elements 10e of the plurality of rod-shaped stiffening elements 10.

As described above with reference to FIG. 2, each two rod-shaped stiffening elements 10 of the plurality of rod-shaped stiffening elements 10 are spaced apart from each other in the hoop direction 3d of FIG. 2 by the predetermined distance 10a of FIG. 2. The latter illustratively corresponds to a respective bay width 12a of each one of the bays 12 and is, preferably, at least two times larger than a predetermined basis width 10f of each one of the plurality of rod-shaped stiffening elements 10. This predetermined basis width 10f preferably further equals at least approximately an associated width 11c of each one of the plurality of ring-shaped stiffening elements 11.

Figure 6:
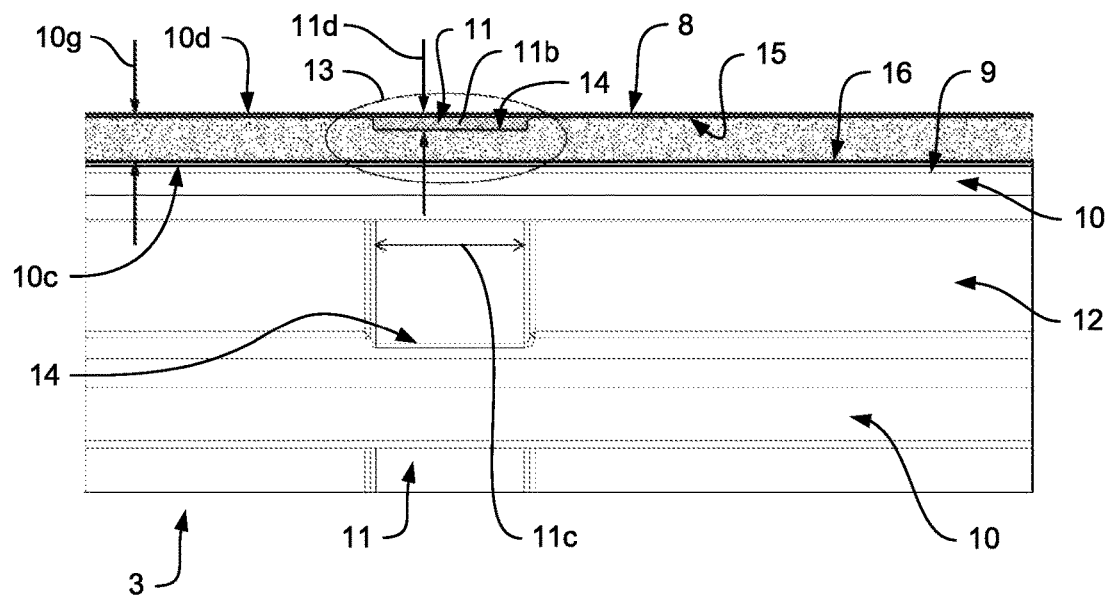
FIG. 6 shows a sectional view of a section of the composite tail boom of FIG. 2.

FIG. 6 shows the composite tail boom 3 of FIG. 3 for further illustrating the arrangement of the ring-shaped stiffening elements 11 of FIG. 3, i. e. each one of the respective ring-shaped stiffener cores 11b of FIG. 4 and, more specifically, each one of the semi ring-shaped stiffener cores 11b of FIG. 4, on the outer skin 8 of FIG. 3 and in the accommodation grooves 14 of FIG. 4 of the rod-shaped stiffening elements 10 of FIG. 3, i. e. the associated core elements 10e of FIG. 3. FIG. 6 further illustrates the exemplary stiffening element intersection 13 of FIG. 2, wherein the ring-shaped stiffening element 11 intersects the rod-shaped stiffening element 10.

According to one aspect, at least one and, preferably, each one of the plurality of ring-shaped stiffening elements 11 comprises a ring-shaped stiffening element thickness 11d in the radial direction 3e of FIG. 2 of the composite tail boom 3, i. e. the tubular tail boom cone 3b of FIG. 1. Preferentially, the ring-shaped stiffening element thickness 11d is smaller than a rod-shaped stiffening element thickness 10g of at least one and, preferably, each one of the plurality of rod-shaped stiffening elements 10 in the radial direction 3e. Preferably, the ring-shaped stiffening element thickness 11d is at least three times smaller than the rod-shaped stiffening element thickness 10g.

It should be noted that modifications to the above described embodiments are within the common knowledge of the person skilled in the art and, thus, also considered as being part of the present invention. In particular, it should be noted that the inventive composite tail boom 3 according to FIG. 1 to FIG. 6, which is preferably implemented as an integral skin-stiffened composite tail boom in semi-monocoque structure, is only exemplarily and illustratively shown and described with respect to an application in a rotary wing aircraft, i. e. the helicopter 1 of FIG. 1. However, the inventive composite tail boom can likewise be adapted to application in other aircrafts, in particular in fixed wing aircrafts. Such an adaptation falls within the common knowledge of the person skilled in the art, who may simply apply the above described teachings that are explained with respect to an integral skin-stiffened composite tail boom in semi-monocoque structure for a rotary wing aircraft to an integral skin-stiffened composite tail boom in semi-monocoque structure for a fixed wing aircraft.

REFERENCE LIST 1 helicopter
1a multi-blade main rotor 1b, 1c rotor blades
1d rotor head
1e rotor shaft
1f landing gear
1g roll axis
1h yaw axis
2 fuselage
2a cabin
2b rear fuselage
3 tail boom
3a horizontal stabilizer
3b tail boom cone
3c tail boom cone hollow interior
3d tail boom cone hoop direction
3e tail boom cone radial direction
4 counter-torque device
4a tail rotor
5 fin
6 connection interface between tail boom and rear fuselage
6a interface plane
7 tail boom section
8 tail boom outer skin
9 tail boom inner skin
10 rod-shaped stiffening elements
10a rod-shaped stiffening element distance
10b lateral rod-shaped stiffening element walls
10c inner rod-shaped stiffening element wall
10d outer rod-shaped stiffening element wall
10e rod-shaped stiffener cores
10f rod-shaped stiffener core basis width
10g rod-shaped stiffener core thickness
11 ring-shaped stiffening elements
11a ring-shaped stiffening element distance
11b ring-shaped stiffener cores
11c ring-shaped stiffener core width
11d ring-shaped stiffener core thickness
12 bay
12a bay width
13 stiffening element intersection
14 ring-shaped stiffener core accommodation grooves
15 outer cap plies
16 inner cap plies

What is claimed is:

1. A composite tail boom for an aircraft, the composite tail boom comprising at least partly a tubular tail boom cone with an outer skin and an inner skin, characterized in that the inner skin delimits a hollow interior of the composite tail boom, wherein a plurality of rod-shaped stiffening elements and a plurality of ring-shaped stiffening elements are arranged between the outer skin and the inner skin, the plurality of rod-shaped stiffening elements being oriented in longitudinal direction of the composite tail boom and the plurality of ring-shaped stiffening elements being distributed along the longitudinal direction in the tubular tail boom cone, and wherein at least one of the plurality of ring-shaped stiffening elements comprises an associated thickness in radial direction of the tubular tail boom cone that is smaller than an associated thickness of at least one of the plurality of rod-shaped stiffening elements in radial direction of the tubular tail boom cone.

2. The composite tail boom of claim 1, wherein the associated thickness of the at least one of the plurality of ring-shaped stiffening elements is at least three times smaller than the associated thickness of the at least one of the plurality of rod-shaped stiffening elements.

3. The composite tail boom of claim 1, wherein each two neighboring rod-shaped stiffening elements of the plurality of rod-shaped stiffening elements are spaced apart from each other in hoop direction of the tubular tail boom cone by a first predetermined distance and that each two neighboring ring-shaped stiffening elements of the plurality of ring-shaped stiffening elements are spaced apart from each other in longitudinal direction of the tubular tail boom cone by a second predetermined distance, wherein the first predetermined distance is smaller than the second predetermined distance.

4. The composite tail boom of claim 3, wherein the first predetermined distance is at least five times smaller than the second predetermined distance.

5. The composite tail boom of claim 1, wherein each two neighboring rod-shaped stiffening elements of the plurality of rod-shaped stiffening elements are spaced apart from each other in hoop direction of the tubular tail boom cone by a predetermined distance that is at least two times larger than a predetermined basis width of each one of the plurality of rod-shaped stiffening elements.

6. The composite tail boom of claim 1, wherein the plurality of ring-shaped stiffening elements are mounted to the outer skin.

7. The composite tail boom of claim 6, wherein the plurality of rod-shaped stiffening elements are mounted to the plurality of ring-shaped stiffening elements and the outer skin.

8. The composite tail boom of claim 7, wherein the plurality of rod-shaped stiffening elements comprises accommodation grooves for accommodating the plurality of ring-shaped stiffening elements.

9. The composite tail boom of claim 1, wherein each one of the plurality of rod-shaped stiffening elements is provided with an associated inner cap ply that is arranged between the rod-shaped stiffening element and the inner skin.

10. The composite tail boom of claim 1, wherein each one of the plurality of rod-shaped stiffening elements is provided with an associated outer cap ply that is arranged between the rod-shaped stiffening element and the outer skin.

11. The composite tail boom of claim 10, wherein the associated outer cap ply is at least partly arranged between each one of the plurality of ring-shaped stiffening elements and the outer skin.

12. The composite tail boom of claim 1, wherein an associated basis width of each one of the plurality of rod-shaped stiffening elements equals at least approximately an associated width of each one of the plurality of ring-shaped stiffening elements.

13. The composite tail boom of claim 1, wherein at least one of the plurality of rod-shaped stiffening elements comprises a trapezoidal cross section.

14. The composite tail boom of claim 1, wherein the outer skin is thicker than the inner skin.

15. An aircraft wherein the aircraft comprises at least one composite tail boom according to claim 1.

* * * * *